(12) United States Patent
Rose et al.

(10) Patent No.: US 7,195,279 B2
(45) Date of Patent: Mar. 27, 2007

(54) GAS FLOW DEFLECTION APPARATUS AND METHOD FOR AIRBAG SYSTEMS

(75) Inventors: Larry D. Rose, South Weber, UT (US); Marc P. Russell, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 344 days.

(21) Appl. No.: 10/655,456

(22) Filed: Sep. 4, 2003

(65) Prior Publication Data

US 2005/0052008 A1   Mar. 10, 2005

(51) Int. Cl.
*B60R 21/20* (2006.01)
*B60R 21/16* (2006.01)

(52) U.S. Cl. .................. 280/740; 280/732; 280/729; 280/739

(58) Field of Classification Search ............. 280/740, 280/729, 742, 732, 739, 730.2
See application file for complete search history.

(56) References Cited

U.S. PATENT DOCUMENTS

| 4,265,468 | A |   | 5/1981  | Suszko et al. |        |
|-----------|---|---|---------|---------------|--------|
| 5,160,164 | A |   | 11/1992 | Fischer et al.|        |
| 5,282,646 | A |   | 2/1994  | Melvin et al. |        |
| 5,494,314 | A |   | 2/1996  | Kriska et al. |        |
| 5,573,270 | A | * | 11/1996 | Sogi et al.   | 280/740|
| 5,918,902 | A |   | 7/1999  | Acker et al.  |        |
| 5,941,559 | A | * | 8/1999  | Rudolf et al. | 280/729|
| 5,951,038 | A | * | 9/1999  | Taguchi et al.| 280/729|
| 6,439,606 | B2| * | 8/2002  | Okada et al.  |280/743.1|
|2002/0135164| A1|   | 9/2002  | Thomas        |        |

FOREIGN PATENT DOCUMENTS

| EP | 0 611 685 A1  |   | 8/1994 |
| EP | 0 933 266 A2  | * | 8/1999 |
| GB | 2 265 118     |   | 9/1993 |
| JP | 5-105024 A    | * | 4/1993 |
| JP | 10-226294 A   | * | 8/1998 |

\* cited by examiner

*Primary Examiner*—Ruth Ilan
(74) *Attorney, Agent, or Firm*—Sally J Brown; Madson & Austin (57) ABSTRACT

An airbag module may include an inflator, a cushion, and a deflection hood. When used as a passenger side, frontal impact module, the cushion deploys upward from a vehicle instrument panel. The deflection hood directs gas downward through a discharge opening and into the cushion to expedite inflation of the lower portion of the cushion to more uniformly cushion a vehicle occupant's body. The discharge opening may be sewn shut via a tear seam to ensure that the discharge opening is properly positioned when the tear seam opens to release inflation gas. Alternatively, the discharge opening may be sewn shut by a non-tearable seam, and perforations may be applied proximate the non-tearable seam so that the discharge opening opens along the perforations to release the inflation gas. According to one alternative, the deflection hood may be angled within the cushion to provide a significant asymmetrical, lateral gas flow.

31 Claims, 5 Drawing Sheets

GAS FLOW DEFLECTION APPARATUS AND METHOD FOR AIRBAG SYSTEMS

BACKGROUND OF THE INVENTION

1. Field of the Invention

The present invention relates to systems and methods for protecting vehicle occupants from injury. More specifically, the present invention relates to a deflection hood that enhances the inflation profile of an airbag cushion.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees from impact, or at other strategic locations.

In the event of an accident, a sensor system within the vehicle senses an impact situation and triggers the ignition of an inflator. Inflation gases from the inflator fill the airbag cushions, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Often, airbags are designed to protect a vehicle occupant disposed at a certain projected position. However, it has been noted that many vehicle occupants are out-of-position ("OOP") at the time a collision occurs. Hence, airbags may advantageously be designed to provide protection for an occupant disposed out of the typical impact position. In the case of passenger side frontal impact airbags, a somewhat larger cushion may be used to protect the passenger. The cushion may extend nearly from the roof to the occupant's lap, and may also have a sizable lateral dimension to provide impact protection in a variety of occupant positions.

Passenger side frontal impact airbags are often installed in the instrument panel of the vehicle. Often, such airbags are installed on an upper surface of the instrument panel. The inflator is installed within the panel and is disposed such that inflation gas flows upward to cause the cushion to expand upward. Consequently, the cushion tends to inflate toward the projected position of the occupant's head. The remainder of the cushion may subsequently fill with inflation gas to cushion the occupant's torso.

However, such inflation may not be desirable because initial contact of only the head with the cushion tends to put excessive strain on the neck. Furthermore, such inflation may provide less protection for an out-of-position occupant.

Known solutions to this problem include the use of cushion tethers, special cushion folding techniques, and internal devices such as loop diffusers. However, such solutions typically have limitations. For example, tethers tend to limit depth of the cushion toward the occupant, thereby reducing early restraint at the middle or rearward seat positions. Special cushion folding techniques are often difficult and costly to perform. Loop diffusers generally provide only limited improvement in deployment performance, and are typically incapable of providing focused gas redirection.

SUMMARY OF THE INVENTION

The apparatus and method of the present invention have been developed in response to the present state of the art, and in particular, in response to the problems and needs in the art that have not yet been fully solved by currently available airbag modules. Thus, it is an overall objective of the present invention to provide an airbag module and associated methods that remedy the shortcomings of the prior art.

To achieve the foregoing objective, and in accordance with the invention as embodied and broadly described herein in one embodiment, an airbag module includes a cushion, an inflator, and a deflection hood disposed within the cushion. The inflator may be seated in a housing, within which the cushion and deflection hood are stowed. The inflator may be connected to an electronic control unit (ECU) that is further coupled to a collision sensor, such as an accelerometer, so that the ECU is able to transmit an activation signal to the inflator in response to detection of a collision by the collision sensor. The vehicle has a windshield and an instrument panel from which the cushion deploys.

The cushion has a first portion and a second portion; in the inflated state, the first portion is disposed above the second portion, toward the projected position of the occupant's head. In the absence of the deflection hood, the inflation gas tends to move into the first portion. The deflection hood has an inlet portion adjacent to the inflator and housing within the instrument panel. The deflection hood also has an outlet portion including forward and rearward regions, and a top portion generally above the outlet portion.

A discharge opening is formed in the rearward region of the outlet portion and a supplemental discharge opening is formed in the forward region of the outlet portion. The top portion of the deflection hood receives most of the inflation gas from the inflator and deflects it downward and out of the deflection hood through the discharge opening. Inflation gas exits the discharge opening along a discharge direction. The discharge direction is angled downward from the horizontal plane by an angle of at least sixty degrees, such that the discharge direction is oriented generally toward the second portion of the cushion.

The top portion also deflects a portion of the inflation gas downward, toward the supplemental discharge opening. The portion of inflation gas exits the supplemental discharge opening along a supplemental discharge direction to provide some venting into the forward regions of the cushion. The deflection hood may also have vents on either side to provide further lateral venting into the cushion.

The cushion has a first side, a second side, and a mounting portion at which the cushion is attached to the housing. The mounting portion is thus disposed adjacent to the instrument panel when the cushion inflates. The deflection hood includes a first fabric and a second fabric section, which are integrally formed with each other and are substantially symmetrical to each other along a lateral direction. The first and second fabric sections have first and second side portions, respectively, which inflate to positions generally parallel to the first and second sides of the cushion.

The first and second fabric sections have first and second outer edges, respectively, along which the first and second fabric sections are attached together by a method such as sewing. The first and second fabric sections also have first and second discharge edges and first and second supplemental discharge edges, respectively. The first and second discharge edges and the first and second supplemental discharge edges are adjacent to the first and second outer edges and are left unattached to provide the discharge opening and the supplemental discharge opening.

In operation, the ECU transmits an activation signal to the inflator in response to detection of a collision. The inflator releases inflation gas, which enters the deflection hood through the inlet portion and flows into the top portion. The top portion redirects the inflation gas into the outlet portion, which releases the inflation gas via the discharge opening and the supplemental discharge opening. The inflation gas exiting through the discharge opening moves toward the second portion of the cushion to expedite inflation of the second portion, thereby providing enhanced cushioning for occupants, especially out-of-position occupants.

Prior to assembly, the airbag module includes a hood panel that will become the deflection hood and a cushion panel that will become the cushion. The airbag assembly also includes a retainer ring and a plurality of nuts capable of engaging the retainer ring. The hood panel has the first and second sections, the outer edges of which have not yet been attached together to form the deflection hood.

The hood panel also has a central strip that connects the first and second fabric sections together; the central strip is integrally formed with the first and second fabric sections. An inlet opening is formed in the central strip to provide for inflation gas entry into the deflection hood from the inflator. The central strip has a periphery that surrounds the inlet opening. A plurality of attachment holes and alignment holes are formed in the periphery to facilitate attachment of the deflection hood to the cushion. The cushion has an inlet opening with a periphery having a similar arrangement of attachment and alignment holes.

The retainer ring has a tubular wall and a flange that extends outward from one end of the tubular wall. Fasteners are integrally formed with or attached to the flange and extend toward the other components of the airbag module, in alignment with the attachment holes of the cushion and the deflection hood. The fasteners may be bolts or other threaded members, or the like. Additionally, tabs are formed in the flange and extend toward the other components of the airbag module, in alignment with the alignment holes.

The housing has side walls and a mounting plate in which an inlet opening is formed, with a configuration similar to those of the hood panel and the cushion panel. The mounting plate has a periphery surrounding the inlet opening, with attachment and alignment holes formed in the periphery. The inflator has an exhaust portion that vents inflation gas through a plurality of holes when the inflator deploys, and a connection portion designed to be coupled to the ECU. The exhaust portion and the connection portion are generally cylindrical in shape. A flange extends outward from between the exhaust and connection portions. The flange has attachment holes aligned with the attachment holes of the deflection hood, the cushion, and the housing, and with the fasteners of the retainer ring.

The airbag module may be assembled by, first, attaching the cushion panel and the hood panel together around the inlet openings of the cushion panel and the hood panel. Then, the cushion panel and the hood panel are closed to form the cushion and the deflection hood, respectively. According to one exemplary method, the edges of the cushion panel are attached together to form the cushion. The first and second sections of the hood panel are then drawn out of the cushion through the inlet openings of the retainer ring, hood panel, and cushion. The outer edges of the first and second sections are then attached together and the first and second sections are inserted back through the inlet openings, into the cushion to form the deflection hood.

The retainer ring is then inserted through the inlet openings of the cushion and the deflection hood. The fasteners are inserted through the attachment holes of the cushion, the deflection hood, the housing, and the inflator. As the retainer ring, deflection hood, cushion, housing, and inflator are brought together, the tabs enter the alignment holes of the deflection hood, cushion, and housing. The exhaust portion of the inflator passes through the inlet openings of the housing, cushion, deflection hood, and retainer ring. The nuts are threaded onto the ends of the fasteners and tightened to attach the retainer ring, deflection hood, cushion, housing, and inflator together.

The cushion and the deflection hood may then be folded by simply compacting the cushion and deflection hood into a stowed volume. No specific or ordered folding method need be used; rather, the cushion and the deflection hood may simply be compressed into the stowed volume. The deflection hood directs the inflation gases entering the cushion so that the manner in which the cushion and deflection hood are folded plays a comparatively small role in determining the inflation characteristics of the cushion.

According to one alternative embodiment of the invention, the discharge edges and the supplemental discharge edges may be attached together in a manner that permits the deflection hood to inflate prior to escape of the inflation gas from the deflection hood. Sewn tear seams or the like may be used. When the inflation gas within the deflection hood reaches a predetermined pressure differential, with respect to the gas outside the deflection hood, the tear seams tear to open the discharge opening and the supplemental discharge opening. Consequently, the discharge and supplemental discharge openings are properly positioned prior to significant discharge of inflation gas from the deflection hood.

According to another alternative embodiment of the invention, the discharge edges and the supplemental discharge edges may be attached together via non-frangible methods, such as sewing to form a non-tearable seam. For example, the outer edges, the discharge edges, and the supplemental discharge edges may be sewn with a continuous, uniform sewing process. In place of tearable seams, perforations may be formed in the outlet portion, proximate the discharge and supplemental discharge edges. When a predetermined pressure differential is reached, the outlet portion tears along the perforations to open the discharge and supplemental discharge openings, thereby releasing inflation gas.

According to another alternative embodiment of the invention, the deflection hood may be oriented to provide asymmetrical discharge within the cushion. For example, the attachment and alignment holes may be rotated about the inlet opening of the deflection hood by an angle so that the deflection hood is angled within the cushion. The discharge opening has an off-center location; hence, inflation gas is discharged along an angle to provide asymmetrical lateral inflation.

Through the use of airbag modules and associated methods of the present invention, airbags may inflate in a manner that more effectively cushions the occupant against impact. Furthermore, the airbag module may be efficiently and cost-effectively manufactured. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The term "grip" refers to items that are in direct physical contact with each other, wherein one item holds the other firmly. The term "overlap" refers to items that are proximate to each other, wherein one extends over and covers a part of the other, but not necessarily in contact with each other.

Figure 1:
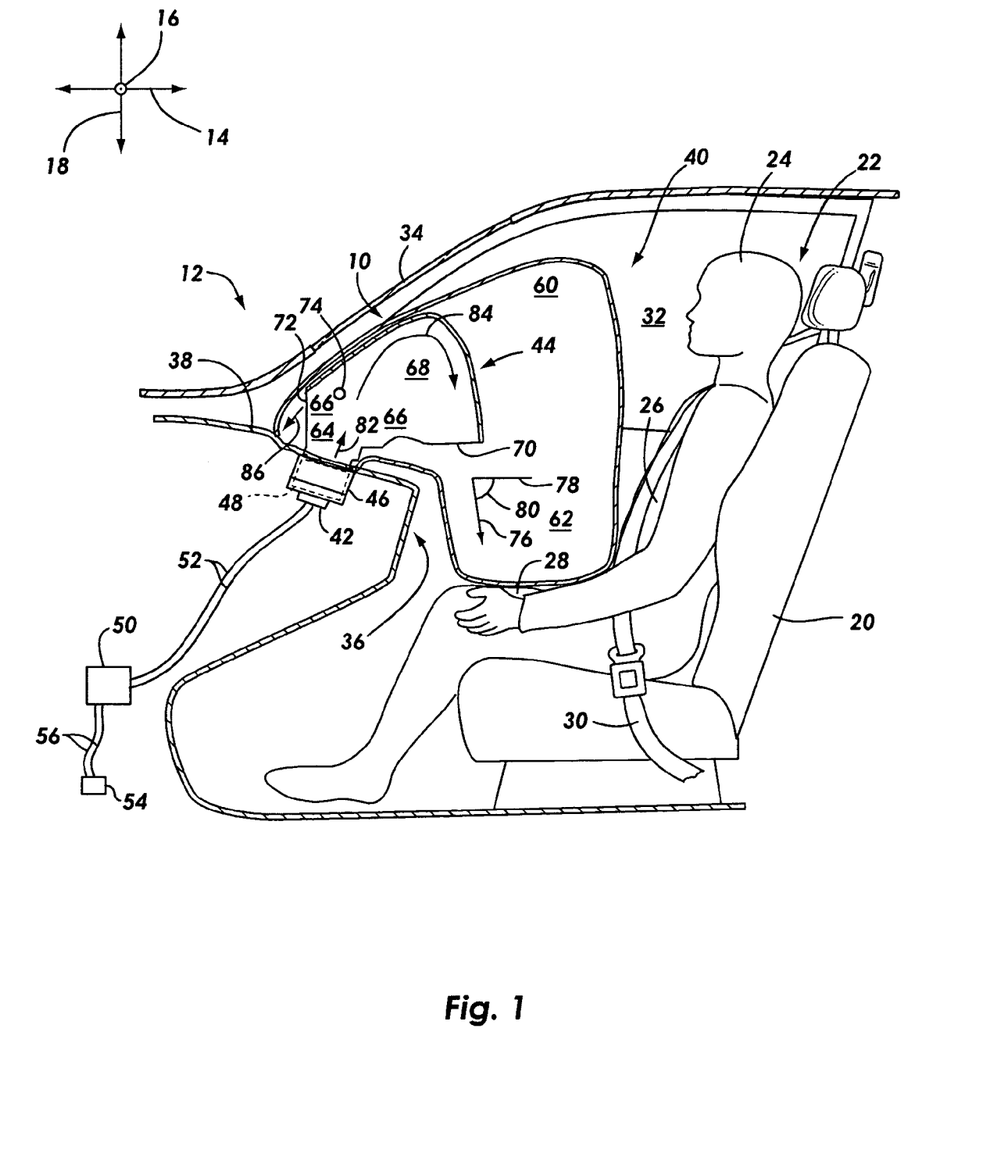
FIG. 1 is a side elevation view of an airbag module according to the invention, mounted as a passenger side, frontal impact airbag within the instrument panel of a vehicle.

Referring to FIG. 1, a side elevation view shows an airbag module 10 according to one embodiment of the invention. The airbag module 10 is designed to provide passenger's side, frontal impact protection. However, those of skill in the art will recognize that the present invention is equally applicable to other types of airbags, such as knee bolsters, overhead airbags, inflatable curtains, inflatable structural stiffeners, and the like.

The vehicle 12 has a longitudinal direction 14, a lateral direction 16, and a transverse direction 18. As illustrated, the vehicle 12 has a seat 20 in which an occupant 22 is seated. The occupant 22 has a head 24, a torso 26, and a lap 28. A seat belt 30 provides primary restraint for the occupant 22. The vehicle 12 also has a front door 32 beside the occupant 22, a windshield 34 forward of the occupant 22, and an instrument panel 36 disposed generally underneath the windshield 34. The airbag module 10 is stowed within an upper surface 38 of the instrument panel 36 so that the airbag module 10 emerges generally upward from the upper surface 38.

As shown, the airbag module 10 has a cushion 40, which is illustrated in fully inflated form. The airbag module 10 also has an inflator 42 seated within the instrument panel 36 to provide inflation gas to the cushion 40. The inflator 42 may be of any known type, including compressed gas, pyrotechnic, and hybrid inflators. The airbag module 10 also has a deflection hood 44 disposed within the cushion 44 to direct the flow of inflation gas into the cushion 40 in a manner that will be more fully set forth hereafter.

The airbag module 10 also has a housing 46 disposed within the instrument panel 36. The housing 46 may be affixed to the interior framework of the instrument panel 36. The inflator 42 is secured to the housing 46 and the cushion 40 and the deflection hood 44 are stowed, prior to deployment, in a stowed volume 48 defined by the housing 46. The stowed volume 48 is outside the inflator 42 so that inflation gas from the inflator 42 must flow into the deflection hood 44 and/or the cushion 40 in order to exit the housing 46.

An electronic control unit 50, or ECU 50, is disposed within the vehicle 12. The ECU 50 need not be located as shown, but may be disposed at a variety of locations within the vehicle 12. The ECU 50 is coupled to the inflator 42 via wires 52. A collision sensor such as an accelerometer 54 or the like is coupled to the ECU 50 via wires 56. The accelerometer 54 transmits a signal to the ECU 50 to indicate that a collision is occurring or is about to occur. The ECU 50 then transmits an activation signal to the inflator 42 to trigger deployment of the inflator 42. The inflator 42 then releases inflation gas to inflate the cushion 40.

The cushion 40 has a first portion 60 that, in the embodiment of FIG. 1, is upwardly disposed when the cushion 40 is inflated. Similarly, the cushion 40 has a second portion 62 disposed toward the lap 28 of the occupant 22, beneath the first portion 60. According to some traditional airbag module designs, the upper portion of the cushion would inflate first to contact the head 24 of the occupant 22, thereby placing excessive strain on the neck. In the airbag module 10, the deflection hood 44 acts to direct inflation gas into the second portion 62 to spread impact with the cushion 40 over a larger portion of the body of the occupant 22.

The deflection hood 44 has an inlet portion 64 adjoining the housing 46 to receive inflation gas from the inflator 42. An outlet portion 66 is disposed generally forward and rearward of the inlet portion 64 to release the inflation gas into the cushion 40. A top portion 68 lies alongside the windshield 34 during inflation and is disposed above the inlet and outlet portions 64, 66. The top portion 68 may comprise the majority of the deflection hood 44, while the inlet portion 64 and the outlet portion 66 are comparatively narrow regions disposed at the periphery of the deflection hood 44.

The outlet portion 66 has a discharge opening 70 disposed generally rearward of the inlet portion 64. Additionally, the inlet portion 64 has a supplemental discharge opening 72 forward of the inlet portion 64. The discharge opening 70 is considerably larger than the supplemental discharge opening 72, and thus releases the majority of the inflation gas. Vents 74 may optionally be provided in the sides of the top portion 68 of the deflection hood 44 to release inflation gas laterally, thereby expediting inflation of the cushion 40 in the lateral direction 16.

As shown, the discharge opening 70 releases inflation gas into the cushion 40 along a discharge direction 76. The discharge direction 76 is oriented generally toward the second portion 62 of the cushion 40, and is thus angled downward from a horizontal plane 78 by an angle 80. The angle 80 may range from about 0° to about 145°. More precisely, the angle 80 may range from about 30° to about 90°. Yet more precisely, the angle 80 may range from about 45° to about 85°. Further, the angle 80 may range from about 60° to about 80°. Yet further, the angle 80 may range from about 65° to about 75°, and may be about 70°.

The inflation gas enters the deflection hood 44 along an inflation direction 82, which may be generally upward. The top portion 68 is rounded in such a manner that a substantial portion of the inflation gas is captured and redirected along a redirection path 84, as illustrated in FIG. 1. The top portion 68 has a generally domed shape. Hence, the redirection path 84 has a comparatively continuous curvature that facilitates stable flow through the deflection hood 44. The redirection path 84 alters the flow orientation of the inflation gas from the inflation direction 82 to the discharge direction 76. In this application, "generally domed" refers to a shape with a continuous, but possibly variable radius three-dimensional curvature that provides an outward bow. A "generally domed" shape need not be a section of a sphere, but may have a more complex shape.

A portion of the inflation gas exits the supplemental discharge opening 72 along a supplemental discharge direction 86, which extends forward to fill forward portions of the cushion 40. The supplemental discharge opening 72 and the vents 74 may be somewhat smaller than the discharge opening 70 so that the majority of the inflation gas is directed out through the discharge opening 70 and toward the second portion 62 of the cushion 40. The supplemental discharge opening 72 and the vents 74 are optional.

Figure 2:
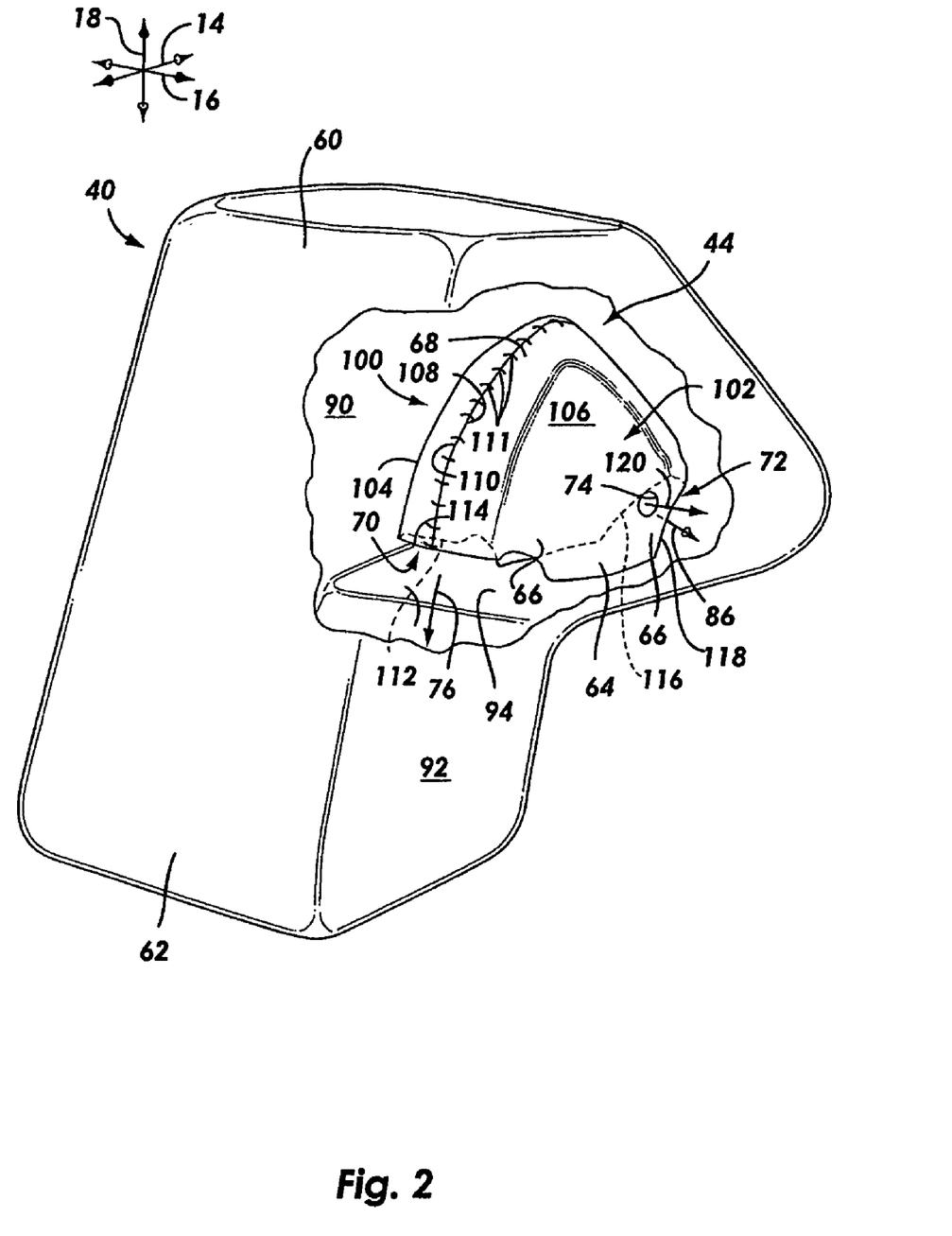
FIG. 2 is a partially cut away perspective view of the cushion and the deflection hood of the airbag module of FIG. 1, during inflation.

Referring to FIG. 2, a cutaway, perspective view further illustrates the cushion 40 and the deflection hood 44 of FIG. 1, during inflation. As shown, the cushion 40 has a first side 90 and a second side 92, which are oriented generally vertically, within parallel planes defined by the longitudinal and transverse directions 14, 18. The cushion 40 also has a mounting portion 94 disposed to lie generally along the upper surface 38 (not shown in FIG. 2) of the instrument panel 36. The inlet portion 64 of the deflection hood 44 is attached to the mounting portion 94, and the mounting portion 94 is attached to the housing 46 in a manner that will be set forth in greater detail subsequently. The cushion 40 may include vents, tethers, or other features known in the art.

The deflection hood 44 has a first fabric section 100 and a second fabric section 102, which are integrally formed with each other (i.e., formed of a single continuous expanse of fabric). The first fabric section 100 extends adjacent and parallel to the first side 90 of the cushion 40 to define a first side portion 104 of the deflection hood 44. Similarly, the second fabric section 102 extends adjacent and parallel to the second side 92 of the cushion 40 to define a second side portion 106 of the deflection hood 44. The first and second side portions 104, 106 and the first and second sides 90, 92 may be somewhat curved during inflation, but are still "generally parallel" to each other. Hence, "generally parallel" members need not be flat or precisely parallel.

The first fabric section 100 of the deflection hood 44 has a first outer edge 108, and the second fabric section 102 has a second outer edge 110. The outer edges 108, 110 extend between the discharge opening 70 and the supplemental discharge opening 72. The outer edges 108, 110 are attached together via a method such as sewing, adhesive bonding, chemical bonding, radio frequency (RF) welding, ultrasonic welding, one-piece weaving (OPW), application of rigid mechanical fasteners, or the like. In the embodiment of FIG. 2, the first and second fabric sections 100, 102 are sewn together to form a seam 111 that attaches the first fabric section 100 to the second fabric section 102.

The first and second fabric sections 100, 102 also have first and second discharge edges 112, 114, respectively, which are disposed adjacent to the first and second outer edges 108, 110, respectively. The first and second discharge edges 112, 114 cooperate to define the discharge opening 70. In the embodiment of FIG. 2, the first and second discharge edges 112, 114 are not attached to each other so that inflation gas is able to flow freely from the discharge opening 70 at the commencement of inflation.

Similarly, the first and second fabric sections 100, 102 have first and second supplemental discharge edges 116, 118, respectively, which are also disposed adjacent to the first and second outer edges 108, 110. The first outer edge 108 is between the first discharge edge 112 and the first supplemental discharge edge 116, and the second outer edge 110 is between the second discharge edge 114 and the second supplemental discharge edge 118. The first and second supplemental discharge edges 116, 118 also cooperate to define the supplemental discharge opening 72, which is open to release inflation gas at the commencement of inflation.

As shown, the visible vent 74 of the deflection hood 44 releases inflation gas along a venting direction 120, which extends, at least in part, along the lateral direction 16. The opposite vent 74 (not visible in FIG. 2) releases inflation gas along a venting direction with a lateral component generally opposite to that of the illustrated venting direction 120. The vents 74 expedite inflation of the lateral extents of the cushion 40, which may enhance protection if the occupant 22 is leaning to one side or the other.

The various elements of the airbag module 10 may be manufactured and assembled according to a wide variety of methods. One such method will be shown and described in connection with FIG. 3, as follows.

Figure 3:
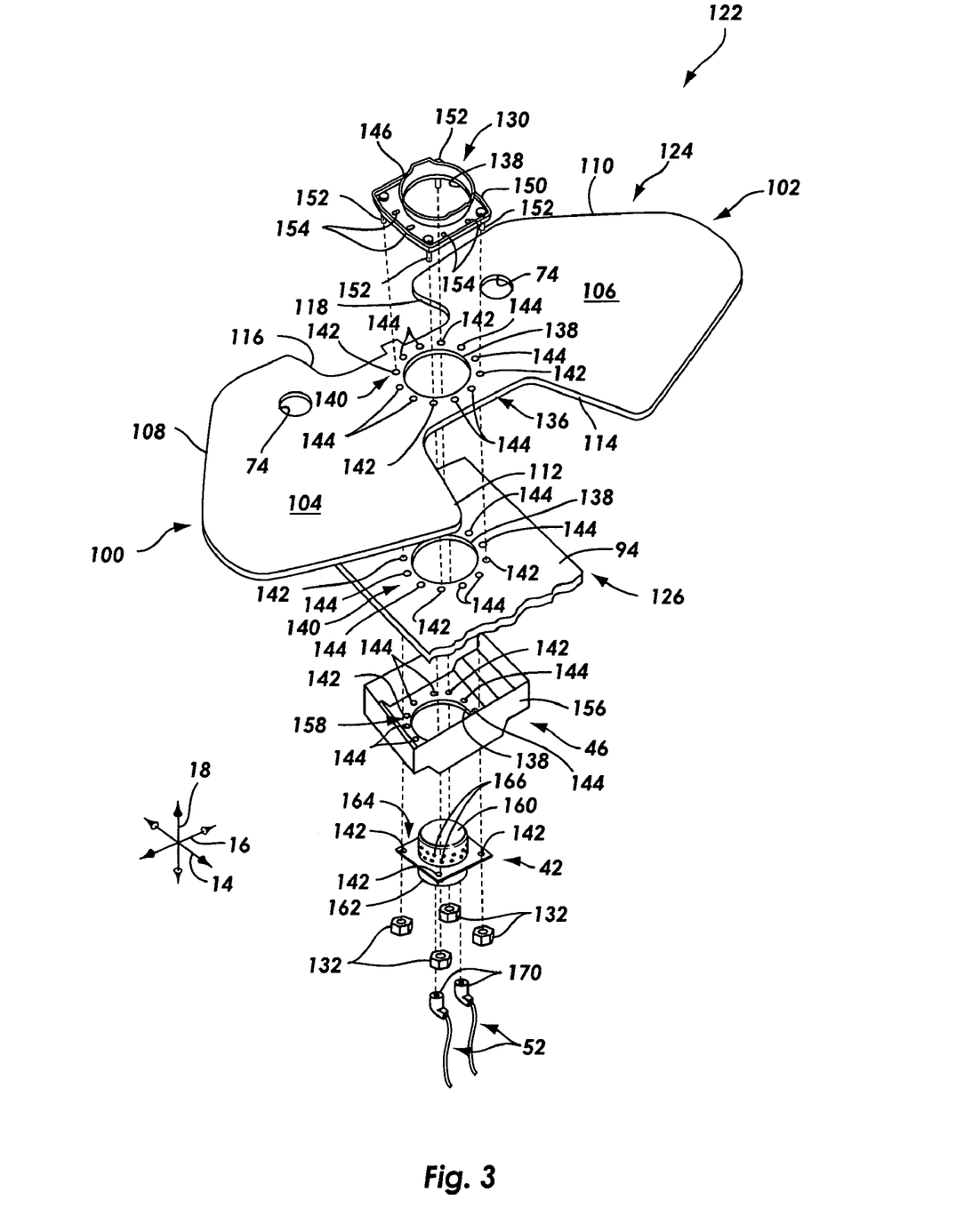
FIG. 3 is an exploded, perspective view of the airbag module of FIG. 1 in a partially assembled state, with only a portion of the cushion shown.

Referring to FIG. 3, a perspective view illustrates an airbag module 122 in an exploded, unassembled state. When assembly is completed, the airbag module 122 will be the airbag module 10 of FIGS. 1 and 2. As shown, the airbag module 122 includes a hood panel 124 that will become the deflection hood 44 and a cushion panel 126 that will become the cushion 40. To avoid obscuring other aspects of the airbag module 122, only the mounting portion 94 of the cushion panel 126 is shown in FIG. 3. The airbag module 122 also has a retainer ring 130 that may be used in conjunction with a plurality of nuts 132 to attach the hood panel 124, the cushion panel 126, the housing 46, and the inflator 42 together.

As illustrated, the first and second fabric sections 100, 102 are formed in the hood panel 124 and are connected together via a central strip 136. The first and second fabric sections are integrally formed in the central strip 136, for example, by laser cutting an expanse of fabric in the shape of the hood panel 124. An inlet opening 138 is formed in the central strip 136, midway between the first and second fabric sections 100, 102. The central strip 136 has a periphery 140 surrounding the inlet opening 138.

A plurality of attachment holes 142 are arranged in radially symmetrical fashion about the periphery 140. A plurality of alignment holes 144 are also arranged about the periphery 140. In the embodiment of FIG. 3, four attachment holes 142 are present, and two alignment holes 144 are disposed between each adjacent pair of attachment holes 142.

The cushion panel 126 may also be formed by laser cutting the shape of the cushion panel 126 from a single expanse of fabric. Alternatively, multiple fabric pieces may be attached together to form the cushion panel 126. The cushion panel 126 may have any of a wide variety of shapes known in the art. The mounting portion 94 of the cushion panel 126 has a similarly disposed inlet opening 138 surrounded by a periphery 140. Attachment holes 142 and alignment holes 144 are arranged about the periphery 140 of the mounting portion 94, in alignment with the attachment holes 142 and alignment holes 144 of the central strip 136 of the hood panel 124.

The retainer ring 130 may be formed of a metal such as steel or aluminum, or may optionally be formed of a plastic, ceramic, or composite. In the embodiment of FIG. 3, the retainer ring 130 has a tubular wall 146 that encircles an inlet opening 138 similar in size to the inlet opening 138 of the hood panel 124 and the inlet opening 138 of the cushion panel 126. The retainer ring 130 also has a flange 150 that extends outward, in the longitudinal and lateral directions 14, 16, from the tubular wall 146.

A plurality of fasteners 152 are attached to or formed integrally with the flange 150, in alignment with the attachment holes 142 of the hood panel 124 and the cushion panel 126. The fasteners 152 extend toward the hood panel 124. Each of the fasteners 152 may be a bolt, a threaded stud, or the like. In the embodiment of FIG. 3, four fasteners 152 are provided to correspond to the number of attachment holes 142 present in the peripheries 140 of the hood panel 124 and the cushion panel 126. Additionally, eight tabs 154 are formed in the flange 150, for example, via punching. The tabs 154 correspond to and are aligned with the alignment holes 144 of the peripheries 140 of the hood panel 124 and the cushion panel 126.

The housing 46 has side walls 156 that define a generally rectangular-prismoidal shape, and a mounting plate 158 disposed generally perpendicular to the side walls 156. The mounting plate 158 has an inlet opening 138 similar in size to the inlet openings 138 of the retainer ring 130, the hood panel 124, and the cushion panel 126. The mounting plate 158 has four attachment holes 142 and eight alignment holes 144 arranged about the inlet opening 138 of the mounting plate 158. The attachment holes 142 and alignment holes 144 of the mounting plate 158 are aligned with the attachment holes 142 and alignment holes 144, respectively, of the hood panel 124 and the cushion panel, and aligned with the fasteners 152 and tabs 154, respectively, of the retainer ring 130.

The inflator 42 may have a generally cylindrical shape with an exhaust portion 160 designed to release inflation gas and a connection portion 162 designed to be coupled to the ECU 50 (not shown in FIG. 3). The exhaust portion 160 is separated from the connection portion 162 by a flange 164 that extends generally along the longitudinal and lateral directions 14, 16. A plurality of attachment holes 142 are formed in the flange 164, in alignment with the attachment holes 142 of the hood panel 124, the cushion panel 126, and the housing 46, and with the fasteners 152 of the retainer ring 130.

A plurality of holes 166 may be formed in the exhaust portion 160 of the inflator 42 to release inflation gas from the interior of the inflator 42 when the inflator 42 deploys. The holes 166 are oriented to release generally radial outflows of inflation gas from the inflator 42, thereby providing substantially thrust-neutral deployment. The wires 52 that couple the inflator 42 to the ECU 50 may have connectors 170 designed to fit into receptacles (not shown) in the connection portion 162 of the inflator 42.

The airbag module 122 may be easily assembled to form the airbag module 10 illustrated in FIGS. 1 and 2. According to one method, the hood panel 124 may first be attached to the cushion panel 126. Stitching (not shown) may be applied along the peripheries 140 around the inlet openings 138 of the hood panel 124 and the cushion panel 126 to attach the hood panel 124 to the cushion panel 126.

Before the retainer ring 130, the housing 46, and the inflator 42 are attached, the hood panel 124 and the cushion panel 126 may be closed to form the deflection hood 44 and the cushion 40, respectively. More precisely, the cushion panel 126 may first be closed by sewing edges (not shown) of the cushion panel 126 together. This may be performed by sewing or other methods known in the art. In this application, "close" does not necessarily refer to complete or airtight enclosure of a space.

If desired, the edges of the cushion panel 126 may be drawn through the inlet openings 138 of the hood panel 124 and the cushion panel 126 prior to attachment, and then inserted back through the inlet openings 138 after attachment, so that upon completion of the process, the edges roll inward toward each other and are attached at internal seams. Such a configuration may provide greater seam strength. In any case, the cushion 40 then encloses the hood panel 124, which has not yet been closed to form the deflection hood 44.

In order to close the hood panel 124, the first and second fabric sections 100, 102 may first be withdrawn at least partially through the inlet openings 138 of the cushion 40 and the hood panel 124, so that the first and second outer edges 108, 110 are accessible from outside the cushion 40. The first and second outer edges 108, 110 may then be sewn together to form the seam 111. As mentioned previously, the first and second discharge edges 112, 114 and the first and second supplemental discharge edges 116, 118 remain unattached to define the discharge opening 70 and the supplemental discharge opening 72.

After the first and second outer edges 108, 110 have been attached together, the first and second fabric sections 100, 102 may be inserted back through the inlet openings 138 of the cushion 40 and the deflection hood 44. Thus, the deflection hood 44 is turned right-side-out and disposed within the cushion 40. The first and second edges 100, 102 are bent inward, toward each other and the seam 111 is disposed within the deflection hood 44.

After the hood panel 124 and the cushion panel 126 have been closed to form the cushion 40 and the deflection hood 44, the retainer ring 130 may be inserted through the inlet openings 138 of the cushion 40 and the hood 44. The retainer ring 130 may then be inserted into engagement, along the transverse direction 18, with the deflection hood 44 and the cushion 40 such that the fasteners 152 extend through the attachment holes 142 and the tabs 154 extend through the alignment holes 144 of the deflection hood 44 and the cushion 40.

The housing 46 and the inflator 42 may be inserted into engagement with the retainer ring 130 along the transverse direction 18. The fasteners 152 then extend through the attachment holes 142 of the hood panel 124, the cushion panel 126, the housing 46, and the inflator 42, and the tabs 154 extend through the alignment holes 144 of the hood panel 124, the cushion panel 126, and the housing 46. The nuts 132 are threaded into engagement with the exposed ends of the fasteners 152 to secure the engagement of the retainer ring 130 with the hood panel 124, the cushion panel 126, the housing 46, and the inflator 42.

The exhaust portion 160 of the inflator 42 then extends through the inlet openings 138 of the housing 46, the cushion 40, the deflection hood 44, and the retainer ring 130. Thus, the exhaust portion 160 is disposed in the interior of the deflection hood 44, within the space defined by the tubular wall 146 of the retainer ring 130. The tubular wall 146 may cover some of the holes 166 of the exhaust portion 160 of the inflator 42 to control the directions along which inflation gas is able to exit the exhaust portion 160. As long as the holes 166 are covered in symmetrical fashion, thrust neutrality of the inflator 42 may be maintained.

The cushion 40 and the deflection hood 44 may then be folded into the housing 46. Folding may be accomplished through the use of automated machinery and/or manual labor. According to one embodiment, the cushion 40 and the deflection hood 44 are not folded according to a pre-established pattern, but are rather simply compacted into the stowed volume 48 within the interior of the housing 46. The term "folding" is used loosely to include both ordered and randomized fabric compaction techniques.

Such randomized folding may be termed "chaos folding," and may enhance the cost-effectiveness of the airbag module 10 by eliminating machinery and process steps required to carry out complex folding methods. Such folding methods are often used in airbag modules to control the inflation path of the cushion. However, the deflection hood 44 of the airbag module 10 may provide such control, even when the compaction of the cushion 40 and the deflection hood 44 is somewhat randomized.

According to alternative embodiments, the cushion 40 and the deflection hood 44 may be folded according to more ordered methods. Such folding may, if desired, be carried out prior to attachment of the housing 46 and the inflator 42 to the retainer ring 130. The folded package including the cushion 40 and the deflection hood 44 may then be coupled to the housing 46 and the inflator 42. Alternatively, ordered folding may be carried out after the housing 46 and/or the inflator 42 have been positioned with respect to the retainer ring 130.

After the cushion 40 and the deflection hood 44 have been folded into the shape of the stowed volume 48, the airbag module 10 is ready to be installed in the vehicle 12. The wires 52 may be attached to the connection portion 162 of the inflator 42 via the connectors 170. The housing 46 may be attached to the interior of the instrument panel 36 in a variety of ways.

When a collision is detected, the ECU 50 transmits an activation signal to the inflator 42 via the wires 52. The inflator 42 receives the activation signal and deploys to release inflation gas from the holes 166 of the exhaust portion 160 of the inflator 42. The inflation gas generally impinges against the top portion 68 of the deflection hood 44 to inflate the deflection hood 44 within the cushion 40. A portion of the inflation gas moves along the redirection path 84 and exits the deflection hood 44 via the discharge opening 70. Other portions of the inflation gas exit the deflection hood 44 via the supplemental discharge opening 72 and the vents 74, as illustrated in FIG. 2.

During deployment, the top portion 68 of the deflection hood 44 lies alongside the windshield 34, as shown in FIG. 1. The pressure of inflation gas within the top portion 68 maintains the shape of the deflection hood 44 despite the reaction pressure exerted on the top portion 68 by the windshield 34. Hence, the deflection hood 44 maintains a consistent general shape during inflation.

The windshield 34 prevents forward motion of the top portion 68. Consequently, the deflection hood 44 is unable to pivot forward in response to the thrust exerted by inflation gas exiting the discharge opening 70. The discharge opening 70 remains in place to discharge inflation gas along the discharge direction 76, as desired. The top portion 68 may be re-shaped in a variety of ways to suit different vehicle configurations and windshield shapes.

The inflation gas is thus directed into the second portion 62 of the cushion 40 to ensure that the second portion 62 inflates rapidly enough to provide relatively uniform impact protection for the head 24 and torso 26 of the occupant 22. The cushion 40 may have vents or gas-permeable membranes designed to release gas from the cushion 40 during inflation at a limited flow rate to limit the stiffness of the cushion 40 during inflation.

In alternative embodiments of the invention, it may be desirable to limit the initial flow of inflation gas from the deflection hood 44 to ensure that the deflection hood 44 inflates properly prior to release of most of the inflation gas into the cushion. This would ensure that the discharge opening 70 rapidly obtains the proper position to release the inflation gas along the discharge direction 76. Furthermore, in alternative embodiments, it may be desirable to implement measures to ensure that the hood panel 124 cannot be closed in a twisted position. Such alternative embodiments will be shown and described in connection with FIGS. 4 and 5, as follows.

Figure 4:
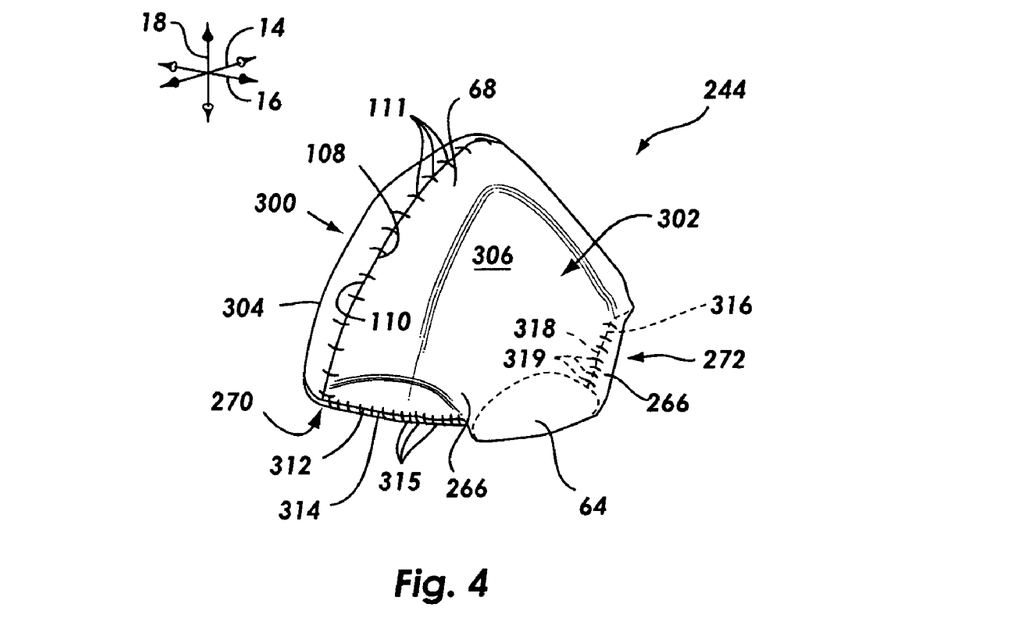
FIG. 4 is a perspective view of a deflection hood suitable for use in the cushion of the airbag module of FIG. 1, according to one alternative embodiment of the invention.

Referring to FIG. 4, a perspective view illustrates a deflection hood 244 according to one alternative embodiment of the invention. The deflection hood 244 may be used in place of the deflection hood 44, in conjunction with the remaining components of the airbag module 10, or with components configured differently from those of the previous embodiment. The deflection hood 244 is shown during the initial stages of inflation.

Like the previous embodiment, the deflection hood 244 has an inlet portion 64 through which inflation gas enters the deflection hood 244 and a top portion 68 that redirects the inflation gas. The deflection hood 244 also has an outlet portion 266, which is configured somewhat differently from that of the previous embodiment, as will be described below. The outlet portion has a discharge opening 270 and a supplemental discharge opening 272 that release inflation gas into a cushion (not shown).

The deflection hood 244 also has a first fabric section 300 and a second fabric section 302. The first fabric section 300 has a first side portion 304, and the second fabric section has a second side portion 306, which are different from the side portions 104, 106 of the previous embodiment in that the vents 74 have been omitted. The first and second fabric sections 300, 302 have first and second outer edges 108, 110, respectively, like those of the previous embodiment, which are attached together via a seam 111.

The first and second fabric sections 300, 302 also have first and second discharge edges 312, 314, respectively, which cooperate to define the discharge opening 270. The first and second discharge edges 312, 314 are different from those of the previous embodiment in that they are attached together via a seam 315. The seam 315 has a strength selected such that, when a predetermined pressure differential exists between the interior and exterior of the deflection hood 244, the seam 315 tears to permit inflation gas to exit the deflection hood 244 via the discharge opening 270.

Similarly, the first and second fabric sections 300, 302 have first and second supplemental discharge edges 316, 318, respectively, which cooperate to define the supplemental discharge opening 272. The first and second supplemental discharge edges 316, 318 are attached together via a seam 319 with a strength selected to permit the seam 319 to tear in response to formation of the predetermined pressure differential to release inflation gas through the supplemental discharge opening 272.

Use of the seams 315, 319 helps to ensure that the deflection hood 244 substantially fills with inflation gas prior to significant gas release into the cushion. Thus, the discharge opening 270 and the supplemental discharge opening 272 will be properly positioned when they open to release inflation gas. Hence, the inflation gas will initially flow along the desired directions (such as the discharge and supplemental discharge directions 76, 86 of FIG. 1), rather than exiting the deflection hood 244 at unpredictable orientations until gas flow through the deflection hood 244 stabilizes.

The seams 315, 319 may be manufactured according to a number of different methods. According to one method, the airbag module including the deflection hood 244 may be assembled as described in connection with the previous embodiment, up to the point at which the deflection hood 44 is closed. Rather than simply sewing the outer edges 108, 110 of the deflection hood 244, the discharge and supplemental discharge edges 312, 314 and 316, 318 are also attached together.

Optionally, the discharge and supplemental discharge edges 312, 314 and 316, 318 may be attached together via continuation of the process used to attach the outer edges 108, 110. One or more parameters of the sewing operation, such as the thread type, stitch spacing, or the like may simply be altered to form the seams 315, 319 in a way that provides a tear strength lower than that of the seam 111. Alternatively, the seams 315, 319 may be sewn through an operation separate from that used to form the seam 111. Once the seams 111, 315, 319 have all been formed, the deflection hood 244 is inserted back into the cushion and disposed right-side out, as described in connection with the previous embodiment.

Tearable attachment of the discharge and supplemental discharge edges 312, 314, 316, 318 has the added advantage of helping to prevent improper closure and installation of the deflection hood 244. More precisely, after the discharge and supplemental discharge openings 270, 272 have been sewn shut, the first and second fabric sections 300, 302 cannot be twisted into the wrong stable position by accidental insertion through the discharge opening 270 or the supplemental discharge opening 272.

Furthermore, improper attachment of the first and second fabric sections 300, 302 may be more immediately noticeable and/or correctable because the discharge edges 312, 314 are shaped and sized differently from the supplemental discharge edges 316, 318. Thus, attachment of one of the discharge edges 312, 314 to one of the supplemental discharge edges 316, 318 will be more immediately obvious.

Figure 5:
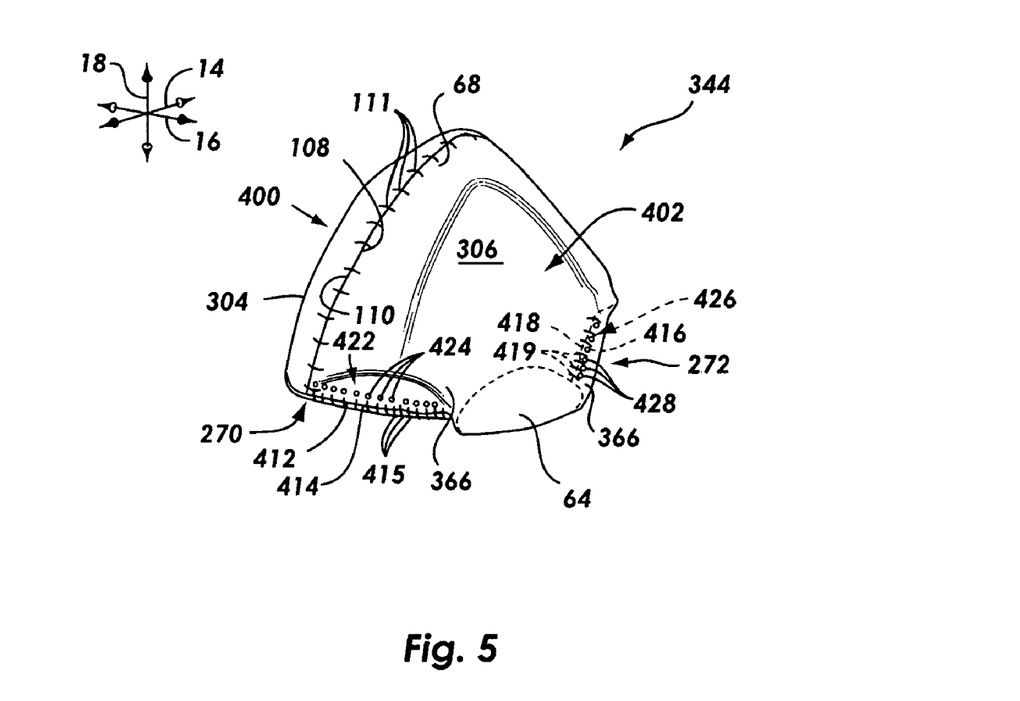
FIG. 5 is a perspective view of a deflection hood suitable for use in the cushion of the airbag module of FIG. 1, according to another alternative embodiment of the invention.

Referring to FIG. 5, a perspective view illustrates a deflection hood 344 according to another alternative embodiment of the invention. The deflection hood 344 may be used in place of the deflection hood 44, in conjunction with the remaining components of the airbag module 10, or with components configured differently from those of the first embodiment. The deflection hood 244 is shown during the initial stages of inflation.

Like the previous embodiments, the deflection hood 344 has an inlet portion 64 that receives inflation gas and a top portion 68 that redirects the inflation gas. The deflection hood 344 also has an outlet portion 366 through which inflation gas is released into a cushion (not shown). The outlet portion 366 has a discharge opening 370 and a supplemental discharge opening 372.

The deflection hood 344 has a first fabric section 400 and a second fabric section 402. The first fabric section 400 has a first side portion 304 like that of the previous embodiment. Similarly, the second fabric section 402 has a second side portion 306. The first and second fabric portions 400, 402 have first and second outer edges 108, 110, respectively, which are also like those of the previous embodiment. The first and second outer edges 108, 110 are attached via a seam 111.

The first and second fabric sections 400, 402 have first and second discharge edges 412, 414, respectively, which cooperate to define the discharge opening 370. The first and second discharge edges 412, 414 are attached together via a seam 415 that is generally non-tearable in nature. The first and second fabric sections 400, 402 also have first and second supplemental discharge edges 416, 418, respectively, which cooperate to define the supplemental discharge opening 372. The first and second supplemental discharge edges 416, 418 are attached together via a seam 419 that is also non-tearable.

The outlet portion 366 has a perforated region 422 formed in the second fabric section 402, proximate the second discharge edge 414. The perforated region 422 has a plurality of perforations 424 arranged in a line along the second discharge edge 414. The perforations 424 are spaced apart such that the perforated region 422 has a low tear strength along the perforations 424. The perforated region 422 may thus tear open to provide the discharge opening 370 when a predetermined pressure differential is reached between the interior and exterior of the deflection hood 344.

Similarly, the outlet portion 366 has a perforated region 426 formed in the second fabric section 402, proximate the second supplemental discharge edge 418. The perforated region 426 has a plurality of perforations 428 arranged in a line along the second supplemental discharge edge 418. Like the perforations 424, the perforations 428 are spaced apart such that the perforated region 428 has a low tear strength along the perforations. Consequently, the perforated region 426 may tear open to provide the supplemental discharge opening when the predetermined pressure differential is reached.

Hence, the deflection hood 344 provides benefits comparable to those of the previous embodiment. The discharge opening 370 and the supplemental discharge opening 372 are generally disposed in their proper positions prior to significant inflation gas release into the cushion. Furthermore, improper closure or installation of the deflection hood 344 is difficult and/or comparatively easy to notice.

The seams 415, 419 may be easily manufactured through methods like those used to form the seam 111. Since the seams 415, 419 are substantially non-tearable, like the seam 111, the seams 111, 415,. 419 may be formed through the use of one continuous sewing operation, with no required parameter changes. Thus, the outer edges 108, 110, the discharge edges 412, 414, and the supplemental discharge edges 416, 418 may be attached continuously together so that the seams 111, 415, 419 are effectively one continuous seam.

The perforations 424, 428 may be formed in a variety of ways. According to one example, the perforations 424, 428 are formed via laser cutting. The perforations 424, 428 may thus be formed as part of a laser cutting process used to form the outer edges 108 110, the discharge edges 412, 414, and the supplemental discharge edges 416, 418 to define the shape of the cushion panel that forms the deflection hood 344.

In certain implementations, it may be desirable to deflect gas in a direction with a lateral component to provide preferential inflation on one side of a deflection hood. Such asymmetrical inflation may be used to compensate for curvature in a windshield or instrument panel, or to enhance out-of-position impact protection. One example of a hood panel designed to provide such laterally asymmetrical inflation gas flow will be shown and described in connection with FIG. 6.

Figure 6:
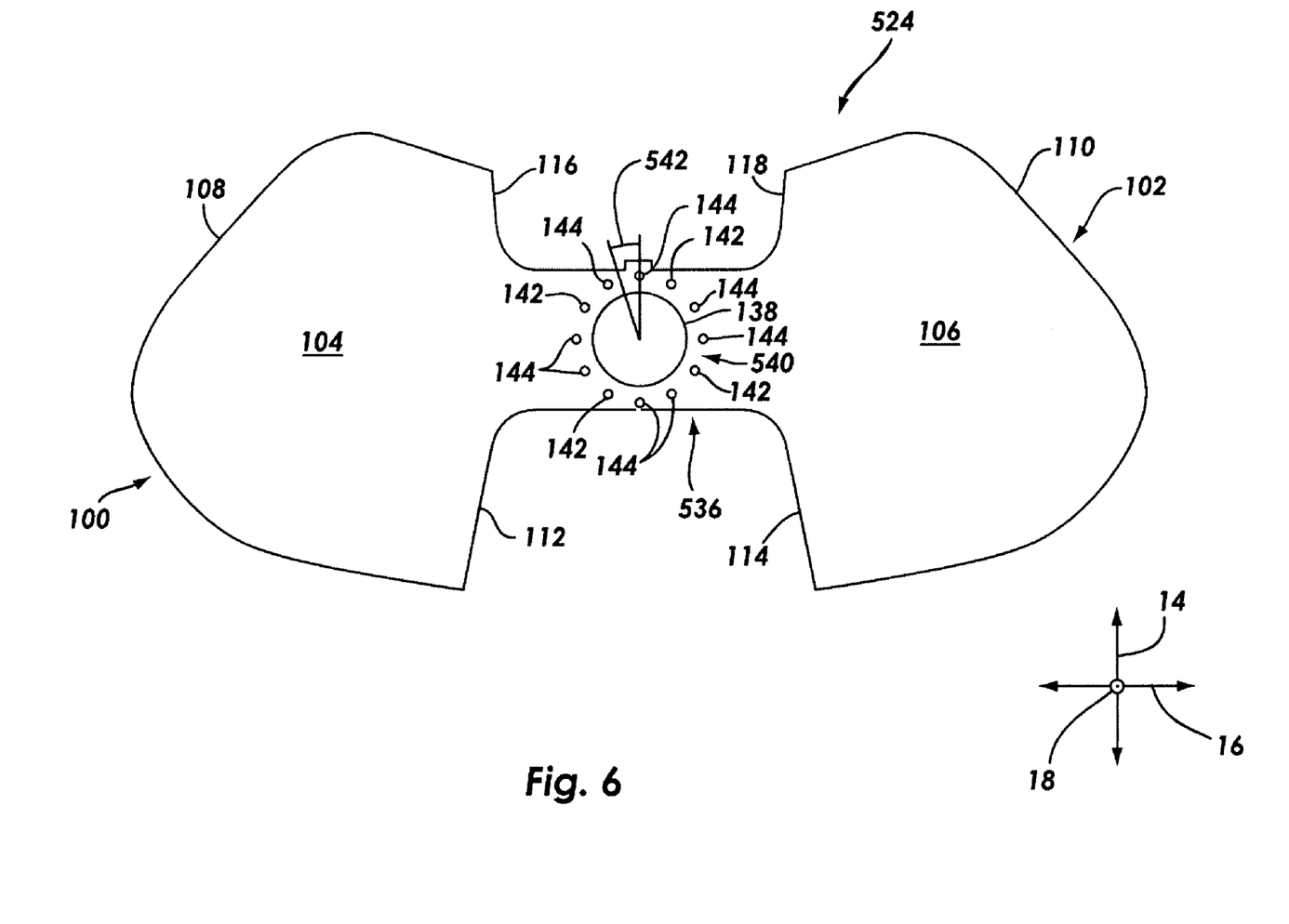
FIG. 6 is a plan view of a hood panel used to form a deflection hood according to another alternative embodiment of the invention.

Referring to FIG. 6, a plan view illustrates a hood panel 524 that may be used to manufacture a deflection hood according to yet another alternative embodiment of the invention. The resulting deflection hood may be used in place of the deflection hood 44, in conjunction with the remaining components of the airbag module 10, or with components configured differently from those of the first embodiment to provide lateral component to inflation gas release into the cushion (not shown).

Like the hood panel 124, the hood panel 524 has a first fabric section 100, a second fabric section 102, and a central strip 536 that couples the first and second fabric sections 100, 102 together. The first and second fabric sections 100, 102 have first and second side portions 104, 106, respectively. Furthermore, the first fabric section 100 has a first outer edge 108, a first discharge edge 112, and a first supplemental discharge edge 116. The second fabric section 102 has a second outer edge 110, a second discharge edge 114, and a second supplemental discharge edge 118.

The central strip 536 has an inlet opening 138 through which inflation gas is able to enter the deflection hood made from the hood panel 124. A periphery 540 surrounds the inlet opening 138. A plurality of attachment holes 142 and alignment holes 144 are distributed about the periphery 540. The attachment holes 142 and alignment holes 144 are similar to those of the embodiment of FIG. 3, and may be used to receive fasteners and tabs like the fasteners 152 and tabs 154 of the retainer ring 130 of FIG. 3.

The periphery 540 is different from the periphery 140 of the hood panel 124 of FIG. 3 in that, in the periphery 540, the attachment holes 142 and alignment holes 144 are rotated from their positions in the periphery 140 by an angle 542. The angle 542 is selected to provide the lateral component to inflation gas release. A larger angle 542 provides increased lateral flow and greater asymmetry. As shown, the angle 542 is about twenty degrees in the embodiment of FIG. 6.

The effect of the angle 542 is that the hood panel 524 may be used in place of the hood panel 124 to provide an airbag module similar in configuration to the airbag module 10 of FIGS. 1 and 2. However, the deflection hood (not shown) produced by closure of the hood panel 524 would be angled such that the discharge opening is directed inboard and the supplemental discharge opening is directed outboard. The result is that most of the inflation gas is directed inboard (e.g., along the leftward lateral direction 16, with respect to the view of FIG. 6) as well as downward.

The lateral discharge component may help to compensate for an instrument panel (not shown) with a curvature that extends toward the vehicle occupants in the middle of the vehicle, and recedes at the ends. Such an instrument panel shape may ordinarily cause the passenger side cushion to inflate outboard. This effect may be at least partially negated by the existence of the angle 542. According to other alternative embodiments, an opposite angle may be used to provide outboard inflation gas flow to compensate for a windshield that curves away from the vehicle occupants in the center. The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag module for protecting an occupant of a vehicle with a windshield from impact, the airbag module comprising:
   an inflator;
   a cushion disposable to receive inflation gas from the inflator along an inflation direction; and
   a deflection hood comprising an inlet portion attached to the cushion, the inlet portion comprising an inlet opening disposed to receive inflation gas from the inflator along the inflation direction, a top portion disposed to limit upward motion of the inflation gas to redirect the inflation gas to a discharge direction angled at least forty-five degrees downward from a horizontal plane, and an outlet portion comprising a discharge opening disposed to release the inflation gas into the cushion along the discharge direction, wherein the top portion is disposed such that the vehicle windshield exerts pressure on the top portion during deployment, wherein the inlet portion, the top portion, and the outlet portion are formed by a first fabric section having a first outer edge and a second fabric section integrally formed with the first fabric section, the second fabric section having a second outer edge attached to the first outer edge to define the discharge opening.

2. The airbag module of claim 1, wherein the outlet portion is closed through the use of a closure method selected to permit the discharge opening to open in response to formation of a predetermined pressure differential across the discharge opening.

3. The airbag module of claim 1, wherein the top portion is disposed to lie alongside a windshield of the vehicle during inflation of the cushion such that the windshield restricts forward pivotal motion of the deflection hood.

4. The airbag module of claim 1, wherein the inlet opening of the deflection hood comprises a periphery attached to a periphery of an inlet opening of the cushion.

5. The airbag module of claim 1, wherein the outlet portion further defines a supplemental discharge opening disposed to release inflation gas along a supplemental discharge direction.

6. The airbag module of claim 1, wherein the top portion comprises two vents disposed to release inflation gas into the cushion along venting directions disposed on either side of the discharge direction.

7. The airbag module of claim 1, wherein the cushion comprises a first side and a second side generally parallel to the first side and the deflection hood comprises first side portion and a second side portion, wherein the first and second side portions are generally parallel to the first and second sides of the cushion during inflation of the cushion.

8. The airbag module of claim 1, wherein the cushion is shaped to provide passenger's side, frontal impact protection.

9. The airbag module of claim 8, wherein the inflation direction extends upward from an instrument panel of the vehicle.

10. The airbag module of claim 9, wherein the cushion is shaped to deploy upward from a stowed position within the instrument panel and to extend downward in response to discharge of the inflation gas along the discharge direction to contact a lap of the occupant.

11. The airbag module of claim 8, wherein the discharge direction is angled at least sixty degrees downward from the horizontal plane.

12. The airbag module of claim 8, wherein the discharge opening is disposed such that the discharge direction has a lateral component that provides asymmetrical inflation gas discharge into the cushion along a lateral direction.

13. An airbag module for protecting an occupant of a vehicle with a windshield from impact, the airbag module comprising:
  an inflator;
  a cushion disposable to receive inflation gas from the inflator along an inflation direction, the cushion comprising a first side and a second side generally parallel to the first side; and
  a deflection hood constructed substantially of a single piece of fabric, the deflection hood comprising an inlet portion comprising an inlet opening disposed to receive inflation gas from the inflator, a top portion disposed to limit upward motion of the inflation gas to redirect the inflation gas to a discharge direction angled downward, a first side portion, and a second side portion, wherein the first and second side portions are generally parallel to the first and second sides of the cushion during inflation of the cushion, wherein the top portion is disposed such that the vehicle windshield exerts pressure on the top portion during deployment.

14. The airbag module of claim 13, wherein the deflection hood comprises a first fabric section having a first outer edge, and a second fabric section integrally formed with the first fabric section, the second fabric section having a second outer edge, wherein the first and second outer edges are attached together to form the first and second side portions and the top portion.

15. The airbag module of claim 13, wherein the inlet portion comprises an inlet opening having a periphery attached to a periphery of an inlet opening of the cushion.

16. The airbag module of claim 13, wherein the cushion is shaped to provide passenger's side, frontal impact protection.

17. A deflection hood for an airbag module for protecting an occupant of a vehicle with a windshield from impact, the airbag module comprising an inflator and a cushion, the deflection hood comprising:
  an inlet portion attached to the cushion, the inlet portion comprising an inlet opening disposed to receive inflation gas from the inflator along an inflation direction;
  a top portion disposed to limit upward motion of the inflation gas to redirect the inflation gas to a discharge direction angled at least forty-five degrees downward from a horizontal plane; and
  an outlet portion comprising a discharge opening disposed to release the inflation gas into the cushion along the discharge direction, wherein the top portion is disposed such that the vehicle windshield exerts pressure on the top portion during deployment, wherein the inlet portion, the top portion, and the outlet portion are formed by a first fabric section having a first outer edge and a second fabric section integrally formed with the first fabric section, the second fabric section having a second outer edge attached to the first outer edge to define the discharge opening.

18. The deflection hood of claim 17, wherein the first and second fabric sections are symmetrical to each other along a lateral direction.

19. The deflection hood of claim 17, wherein the outlet portion is closed through the use of a closure method selected to permit the discharge opening to open in response to formation of a predetermined pressure differential across the discharge opening.

20. The deflection hood of claim 17, wherein the top portion is disposed to lie alongside a windshield of the vehicle during inflation of the cushion such that the windshield restricts forward pivotal motion of the deflection hood.

21. The deflection hood of claim 17, wherein the inlet opening of the deflection hood comprises a periphery attached to a periphery of an inlet opening of the cushion.

22. The deflection hood of claim 17, wherein the outlet portion further defines a supplemental discharge opening disposed to release inflation gas along a supplemental discharge direction.

23. The deflection hood of claim 17, wherein the top portion comprises two vents disposed to release inflation gas into the cushion along venting directions disposed on either side of the discharge direction.

24. A deflection hood for an airbag module for protecting an occupant of a vehicle with a windshield from impact, the deflection hood being used with the windshield, the airbag module comprising an inflator and a cushion, wherein the cushion is disposable to receive inflation gas from the inflator along an inflation direction oriented toward a first portion of the cushion, the deflection hood comprising:
  a first fabric section having a first outer edge; and
  a second fabric section integrally formed with the first fabric section, the second fabric section having a second outer edge, wherein the first and second outer edges are attached together to define a discharge opening oriented such that inflation gas is redirected by the deflection hood from the inflation direction toward a second portion of the cushion, wherein the deflection hood further comprises a top portion disposed such that the vehicle windshield exerts pressure on the top portion during deployment.

25. The deflection hood of claim 24, wherein the first fabric section has a first discharge edge adjoining the first outer edge and the second fabric section has a second discharge edge adjoining the second outer edge, wherein the discharge edges remain unattached to form the discharge opening.

26. The deflection hood of claim 25, wherein the first fabric section has a first supplemental discharge edge adjoining the first outer edge and the second fabric section has a second supplemental discharge edge adjoining the second outer edge, wherein the supplemental discharge edges remain unattached to form a supplemental discharge opening disposed to release inflation gas along a supplemental discharge direction.

27. The deflection hood of claim 24, wherein the first and second sections are coupled together by a central strip narrower than the first and second sections in a longitudinal direction, wherein the central strip is unitarily formed with the first and second sections, wherein the central strip comprises an inlet opening through which inflation gas enters the deflection hood from the inflator.

28. The deflection hood of claim 24, wherein the first and second outer edges are sewn together.

29. A deflection hood for an airbag module for protecting an occupant of a vehicle from impact, the airbag module comprising an inflator and a cushion, the deflection hood comprising:
   an inlet portion comprising an inlet opening disposed to receive inflation gas from the inflator along an inflation direction;
   a top portion disposed to limit upward motion of the inflation gas to redirect the inflation gas to a discharge direction angled downward; and
   an outlet portion comprising a discharge opening disposed to release the inflation gas into the cushion along a discharge direction different from the inflation direction, wherein the discharge opening is closed through the use of a closure method selected to permit the discharge opening to open in response to formation of a predetermined differential across the discharge opening, wherein the inlet portion, the top portion, and the outlet portion are formed by a first fabric section having a first outer edge and a second fabric section integrally formed with the first fabric section, the second fabric section having a second outer edge attached to the first outer edge to define the discharge opening, wherein the closure method comprises sewing the discharge opening shut and perforating the deflection hood proximate the discharge opening to form a perforated region having a strength selected to tear in response to existence of the predetermined pressure differential.

30. The deflection hood of claim 29, wherein, at the predetermined pressure differential, the deflection hood is inflated so that the discharge opening is disposed to release the inflation gas along the discharge direction prior to opening of the discharge opening.

31. The deflection hood of claim 29, wherein the outlet portion further defines a supplemental discharge opening disposed to release inflation gas along a supplemental discharge direction, wherein the supplemental discharge opening is closed through the use of the closure method.

* * * * *